United States Patent [19]

Ward

[11] 4,062,377

[45] Dec. 13, 1977

[54] PNEUMATIC RETARD HAVING STROKE-ACCELERATING VALVE

[75] Inventor: David M. Ward, La Jolla, Calif.

[73] Assignee: Potter Electric Signal Co., St. Louis, Mo.

[21] Appl. No.: 591,871

[22] Filed: June 30, 1975

Related U.S. Application Data

[62] Division of Ser. No. 430,203, Jan. 2, 1974, Pat. No. 3,912,247.

[51] Int. Cl. ............................................... F16k 15/00
[52] U.S. Cl. .................................... 137/523; 137/846
[58] Field of Search ................... 239/333; 251/35, 36, 251/47, 23, 52; 137/317, 525.1, 846, 558, 320; 200/81.6, 34

[56] References Cited

U.S. PATENT DOCUMENTS

| 2,594,320 | 4/1952 | LeClair | 137/525.1 |
| 2,772,116 | 11/1956 | Dobkin | 239/333 |
| 3,406,909 | 10/1968 | Pfeiffer | 239/333 |
| 3,437,246 | 4/1969 | Clapp | 137/525.1 |

FOREIGN PATENT DOCUMENTS

| 578,876 | 7/1959 | Canada | 137/317 |
| 1,308,977 | 10/1962 | France | 137/846 |

Primary Examiner—Martin P. Schwadron
Assistant Examiner—G. L. Walton

[57] ABSTRACT

A pneumatic retard, of the type used to achieve time-delayed actuation of water-flow alarms or other devices, has a pneumatic chamber from which air is slowly discharged under the pressure applied by a spring-driven plunger. The chamber has an air discharge valve, which also serves as an inlet valve. When the actuating plunger has been released and has traveled to a position at which much of the air has been exhausted, the discharge valve is opened, releasing the remaining air pressure. This releases the plunger to travel from that point onward with a rapid actuating stroke.

2 Claims, 5 Drawing Figures

U.S. Patent  Dec. 13, 1977  4,062,377
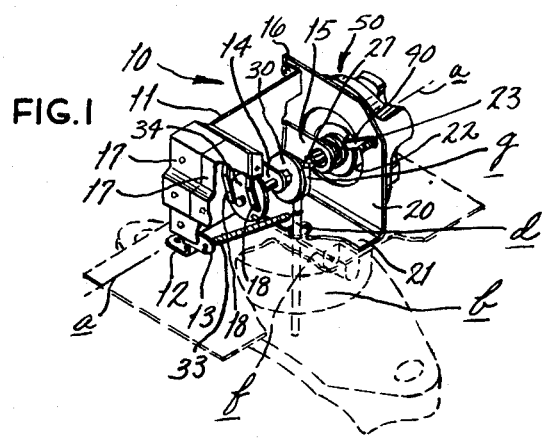
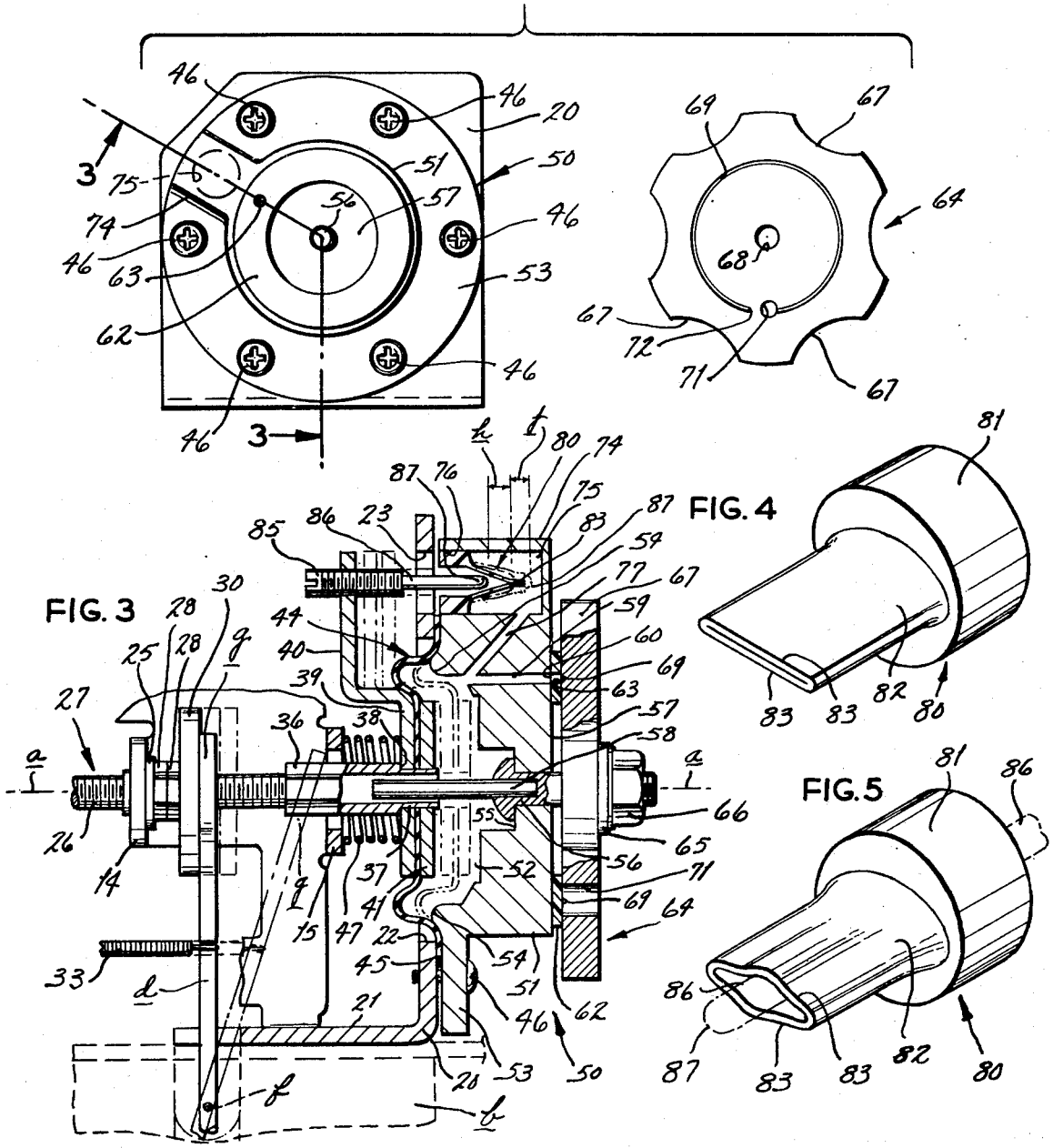

PNEUMATIC RETARD HAVING STROKE-ACCELERATING VALVE

This is a division, of application Ser. No. 430,203 filed Jan. 2, 1974 now Pat. No. 3,912,247.

BACKGROUND OF THE INVENTION

Pneumatic retards are conventionally utilized in various types of alarm systems, to assure that the condition to be detected continues for a sufficient period to assure its existence. For example, the detection of water flow in the pipes of alarm systems, such as would indicate the discharge of a sprinkler head, might be falsely signalled by a single surge of water in the pipe; hence water flow should continue for a chosen number of seconds before an alarm is signalled.

Pneumatic retards of a type now used operate by releasing a plunger which, under spring pressure, slowly moves over a predetermined stroke and forces the air out of a pneumatic chamber through a constricted passage. At the end of its stroke it actuates one or more signal switches. There are numerous patents on such constructions, some of which recognize the need for a rapid, snap-action to actuate the switches. For example U.S. Pat. No. 2,627,919 shows how an electric switch may be actuated by a plunger of a pneumatic retard, the switch being given a snap action by mechanism associated with a switch itself. Applicant is unaware of any prior mechanism in which a rapid actuating movement is imparted near the close of the plunger stroke by suddenly increasing the speed of the plunger itself.

Alarm systems of the type described conventionally include two switches, one of which may actuate a local alarm and the other transmit an alarm signal to a remote alarm center. A simple but undesirable way of doing this is to have both switches physically actuated by the slow movement of the plunger. Both signals should be sent simultaneously; difficulties would be caused if the condition detected continued long enough to actuate one of such alarms but not the other. This may happen if two switches are to be operated by a slowly moving retard plunger; mechanical tolerances of electrical switches physically ganged may cause one to lag after the other is actuated.

SUMMARY OF THE INVENTION

One of the objects of the present invention is to afford to a pneumatic retard, of the type in which a spring-driven plunger moves slowly to exhaust air in a pneumatic chamber, a final actuating stroke portion which is rapid, by which it will quickly actuate electrical switches substantially instantaneously. Another object is to achieve such rapid stroke portion by valving means which will not leak during the retarded stroke portion and will admit air into the chamber on the return stroke, all with a minimum of complexity and with maximum reliability. Other objects will appear from the description which follows.

Generally summarizing the present invention, I provide a pneumatic retard suitable for actuating electrical switches, as well as certain types of valves or other devices. Conventionally it includes a rigid chamber member with a rubber membrane extending sealedly across, to form a variablesize pneumatic chamber, and an air escape retard passage which may be adjusted to provide desired time delay. A condition-sensing device is normally held pressed against the plunger to draw the flexible membrane away from the chamber member and hold its pneumatic chamber at maximum volume, overcoming the bias of a plunger spring. When the condition-sensing device ceases to exert such pressure, the plunger is released; and its spring drives it slowly to discharge the air in the pneumatic chamber through the air escape retard passage.

Unlike prior art, in the present invention the pneumatic chamber has also an air exhaust passage outward of the membrane, the passage having at its exit a discharge valve, held closed positively by any excess of chamber pressure over atmospheric pressure. Preferably the valve is of the type which will admit air on a reversal of pressures, as when the plunger is drawn to enlarge the volume in the chamber. The plunger carries means, such as a pin-like member projecting toward the valve, to open it mechanically when the plunger, after slow movement to drive air through the retard passage, has reached a selected reduced-volume position along its stroke length. In the preferred embodiment which utilizes a lip-type valve, when this selected position is reached the pin-like member penetrates and opens the valve lips. This results in the sudden exhaust of chamber air pressure through the discharge valve, so that the plunger then moves almost instantaneously to the end of its stroke, rapidly operating the switches or other devices. When several such switches are ganged together, the rapidity of this stroke portion overcomes their mechanical tolerances to operate them in precise synchronization.

BRIEF DESCRIPTION OF THE DRAWINGS

FIG. 1 is a perspective view partly from the rear of a pneumatic retard assembly having a stroke accelerating valve embodying the present invention, shown mounted on a water flow signaling device indicated in dashed lines.

FIG. 2 is a front elevation of the retard of FIG. 1, with the time-delay adjusting knob removed and laid open alongside and to the right thereof.

FIG. 3 is an enlarged sectional view taken along line 3—3 of FIG. 2, with the adjusting knob in place. The solid lines show the positions of the parts when the actuating plunger is drawn back substantially to maximum volume position of the pneumatic chamber, as when no water flow is sensed. The single dotted phantom lines shown the position of the parts when, after water flow is sensed, the actuating plunger has reached a reduced volume position, in which air remaining in the pneumatic chamber is about to be exhausted. The double dotted phantom lines show the actuating plunger at the close of its stroke.

FIG. 4 is an enlarged perspective view of the valve of FIG. 3, in relaxed position, and corresponding to the solid line position of FIG. 3.

FIG. 5 is an elevational view of the valve of FIG. 4 showing its lips forced open as in the double dotted line position of FIG. 3.

DESCRIPTION OF THE PREFERRED EMBODIMENT

The pneumatic retard of the present invention is well adapted for use with alarm sensing devices which have outstanding levers whose shift of position indicates existence of a condition to be sensed. Typical of these is a conventional water flow sensor, generally designated $b$ in FIG. 1, adapted to be sealedly installed on a water pipe. Such sensor $b$ typically mounts within the pipe a flow-sensing vane, not shown, on the inner end of sensor lever *d* pivoted on a lateral rod *f* and having a forked outer end *g*.

A preferred embodiment of the retard of the present invention is illustrated, assembled on a mounting bracket generally designated 10. The bracket 10 includes a fore-and-aft extending side plate 11 from which are bent a number of flanges including a rear base support flange 12, a tension spring connector flange 13, plunger bearing support flange 14, a centrally apertured compression spring support flange 15 and a front plate attachment flange 16. To the rear end of the side plate 11 are mounted a pair of electrical switches 17 of the normally closed type, having switch operating arms 18 projecting downward and forward parallel to each other and each side of a fore-and-aft axis a—a.

Secured to the forward end of the mounting bracket 10 is a forward plate 20 having a rearwardly bent base flange 21, to which the side plate 11 is also secured. Concentric with the axis a—a the forward plate 20 has a large circular opening 22 which serves as a framing member for the flexible membrane hereinafter described. Outwardly of the circular opening 22 it has an exhaust port opening 23 to which reference is made subsequently.

Carried on a plastic insert bearing 25 fitted in a bore on the plunger bearing support flange 14, so as to be concentric with the axis a—a, is the preferably threaded shaft 26 of a plunger generally designated 27. Spaced by jam nuts 28 on the shaft 26 is a fork-abutting disk 30 whose forward surface is abuttingly engaged by the upper yoke end *a* of the lever *d*. A tension spring 33 connected between the lever *d* and the connector flange 13 tends to hold the lever *d* in aft, erect position as shown in FIG. 1 and in solid lines in FIG. 3. Conventional provisions may be made for screw adjustment of its tension.

A switch-abutting disk 34 seen in FIG. 1 abuts the switch arms 18 to control their position. Its precise position on the threaded plunger shaft 26 is likewise fixed by jam nuts, not shown. When no flow of water is sensed by the sensor *b*, the disk 34 holds the switches 17 open, being normally pressed aft by the yoke end *g* due to the tension in the spring 33.

At the forward end of the plunger 27, where it extends through the aperture of the compression spring support flange 15, is mounted an internally threaded forward-extending shaft coupler 36, having an integral hollow forward end 37 of lesser outer diameter, thus providing a shoulder 38. Press-fitted onto the forward end 37 against the shoulder 38 is a generally washer-like clamping member 39 against which is fitted the aft surface of a membrane 44, hereafter described, at whose forward surface is a pressfitted clamping washer 41. The aft membrane-clamping member 39 has a Z-shaped arm 40 extending radially outward toward the exhaust port opening 23 of the forward plate 20.

The clamping member 39 and washer 41 sealedly mount the central portion of a flexible rubber-like membrane generally designated 44, which terminates in a radially outer edge 45 sealedly clamped, by screws 46 through the forward plate 20, to the aft surface of a chamber casting 50 described hereinafter.

Between the compression spring support flange 15 and the clamping member 39 is mounted a compression spring 47 which directs the operating stroke of the plunger 27, as hereinafter described. It is designed to be weaker than the tension spring 33.

A chamber casting generally designated 50 is seen near the right end of FIG. 1, and is shown in elevation at the left side of FIG. 2 and in broken cross-section in FIG. 3. It includes a deep central rounded hub portion 51 hollowed at its aft side to provide a chamber cavity 52. The hub portion 51 is surrounded by a radially outer mounting flange 53. Through the flange 53 the clamping screws 46 extend, and seal the membrane outer edge 45 as above described. On the aft side of the casting 50 between the flange 53 and the cavity 52 is a rounded annular ridge 54. Its function is to assure that the curvature of the membrane 44 will not reverse, but will always be generally as shown in FIG. 3, regardless of the forward and aft movements of the plunger 27.

Centrally the chamber cavity 52 has a well portion 55, bored along the axis a—a. A knob-mounting bolt 56, whose head is accommodated within the well portion 55, extends through the bore to project forwardly of the planar machined forward surface 57 of the hub portion 51. The head of the bolt 56 is drilled axially to receive a press-fitted guide pin 58 which extends along the axis a—a, projecting into the hollow end 37 of the coupler 36 to keep it centered.

A passage for the flow of retard air, referred to as the principal passage 59, extends from the base of the cavity 52 just inward of the annular ridge 54, forwardly to a principal passage opening 60 in the machined forward surface 57. Overlaying this surface, and mounted thereon as by cementing is a washer-like retard seal 62. It is formed preferably of a thin smooth parallel-side sheet of planar plastic material, not so soft or rubbery as to flow under the compression to which it is subjected. The retard seal 62 is penetrated by an opening 63 registering within the retard air opening 60 at the outlet of the passage 59.

Mounted on the bolt 56 is a timing control knob generally designated 64 shown at the right side of FIG. 2 and in FIG. 8, being secured and pressed against the retard seal 62 by washers 65 and a nut 66. The knob 64 has along its outer surface hand grip indentations 67, and a central bore 68. The rear surface of the knob 64, as shown in elevation at the right side of FIG. 2, is machined to be smooth and planar, and is provided with an arcuate air retard metering groove 69 of somewhat less than 360° extent, formed about the axis of the bore 68. The radius of the metering groove 69 equals the radial distance from the axis a—a to the retard air opening 60 of the casting 50. The groove 69 is a narrow, shallow cut so small in cross-section as, when closed by the retard seal 62, to form an elongated metering orifice which retards air flow, as it known. It terminates at and communicates with a retard air escape bore 71, which extends forwardly to the forward surface of the knob 64, and whose diameter is sufficiently large to offer no resistance to air flow. The opposite terminus 72 at which the metering groove 69 begins is spaced from the retard air escape bore 71 a distance slightly less than its diameter. When the knob 64 is mounted by the nut 66 as shown in FIG. 3, the effective length of the retard groove 69 will be the arcuate length from the casting air opening 60 to the knob escape bore 71. Turning the knob adjusts this effective length to provide a desired interval of time delay.

The hub portion 51 has, at the section shown at the upper left in FIG. 2, a radially outward extension, to house a secondary chamber 75 as shown in cross-section in FIG. 3. The secondary chamber 75 has large diameter rearward facing port opening 76, aligned with the exhaust port opening 23 in the forward plate 20. An air communication passage 77 is provided from the cavity 52 to the secondary chamber 75; conveniently it may be drilled forwardly and outwardly from the juncture of the principal air passage 59 with the cavity 52, as shown in FIG. 3.

Mounted within the port 76 of the chamber 75 is a valve generally designated 80, best seen in FIGS. 4 and 5. Preferably it is fabricated of a material, such as silicone rubber, characterized by a degree of surface cohesion; various materials having this characteristic are known, including silicones and polyurethanes. The valve has a large annular flange portion 81 whose diameter equals the inner diameter of the port 76 in which it is mounted, as by cementing. Projecting inwardly into the chamber 75 from the annular flange part 81, the valve 80 has a mouth portion 82 terminating in elongated flexible upper and lower lip portions 83 whose outer edges are continuous with each other and whose inner surfaces taper toward and are normally presented flatwise against each other, for cohesion of their inner surfaces. Utilizing the silicone rubber material to fabricate a valve of the proportions shown and whose flange portion 81 is approximately 5/16 inch in diameter, the cohesion is such that a positive pressure of approximately 0.018 p.s.i. inwardly of the lips 83 is necessary to separate them. Such cohesion serves in effect to avoid leakage at zero excess of chamber pressure over external atmospheric pressure.

Near the outward end of the Z-shaped arm 40, and adjustably secured therein by a screw mount 85, is a forwardly projecting valve opening pin 86, formed of a smooth plastic material and having a rounded tip end 87, so as to avoid damage to the valve 80. The valve opening pin 86 projects parallel to the axis a—a and is aligned precisely with the center of the port 76.

The operation of the present retard will now be described, particularly with reference to FIGS. 3 and 5. When the sensor $b$ senses no water flow, its operating lever $d$ will be held by the tension spring 33 upright, in the positions shown in solid lines in FIG. 3, so its yoke end $g$ will hold the disk 30 in aft position; hence the aft-positioned plunger 27 and its switch-abutting disk 34 will hold the switch operating arms 18 in aft. switch-open position. The membrane 44 will then be in the solid line position of FIG. 3, with the chamber cavity 52 enlarged to its maximum. Also, the arm 40 will hold the valve opening pin 86 well aft of the valve lips 83, which will remain together, sealed by surface cohesion.

Whenever water flow is sensed by the sensor $b$ sufficiently to overcome the tension in the spring 33, the sensor lever $d$ will pivot forwardly, as shown in phantom lines of FIG. 3. This releases the plunger 27 for forward movement, under the urging of the compression spring 47. However, forward movement is resisted by the air forwardly of the membrane 44, both in the chamber cavity 52 and in the secondary chamber 75. Slight forward movement of the plunger increases the pressure of this air to offset the increment of force exerted by the spring 47 per that exerted by the now extended tension spring 33. Such a pressure increment in the secondary chamber 75 will hold the valve 80 closed even without cohesion of the lip surface. The only path of air escape is through the principal retard passage 59 to the arcuate metering groove 69 and the knob escape bore 71. The time required for the metered air escape from the chamber 52 thus becomes a function of the angular displacement of the knob escape bore 71 from the retard air passage 59.

When the plunger has moved from the maximum chamber volume position, shown in solid lines in FIG. 3, to a position to where the tip 87 of the pin 86 will penetrate and separate the valve lips 83, the remaining air pressure will suddenly be discharged by passage of air from the cavity 52 through the communicating passage 77 to the secondary chamber 75 and thence between the valve lips 83 through the spaces alongside the pin 86, as shown in FIG. 5. This sudden discharge or dumping of the chamber pressure releases the plunger 27 so that, biased by the compression spring 47, it moves in an instantaneously accelerated stroke to shift the membrane 44 to minimum volume position, shown in phantom lines in FIG. 3. Thus, the stroke of the plunger 27 has the two portions, shown in FIG. 3 as related to the position of the pin 86:

First, from maximum chamber volume position to a reduced volume position, the plunger stroke proceeds slowly (as adjusted by the control knob 64) over the distance $h$; and Second, starting with the opening of the valve lips 83 at the reduced volume position, the stoke to the minimum volume position is rapid over the distance $j$.

Accordingly, assuming that the water flow sensor $b$ continues to hold the lever $d$ forward throughout the time interval required for the stroke portion to reduced volume position, a rapid accelerated stroke portion will follow instantaneously to carry the switch-abutting disk 34 abruptly forward. This releases the switch arms 18 so that they snap simultaneously to close their circuits. This action avoids the possibility that one may operate at any appreciable time interval before the other. If such were the case a sudden cessation of water flow might leave one of the switches still open, so that it failed to signal even through the other switch had been closed.

While the valve 80 has been spoken of as an air discharge valve, it also serves as an air inlet valve; thus the secondary chamber 75 and the communicating passage 77 are also parts of the air inlet system. When the sensor $b$ no longer senses a water flow condition, the tension of the spring 33 will draw the sensor lever $d$ back, causing its yoke end $g$ again to abut the forward surface of the disk 30 and push the plunger 27 aft to the FIG. 3 solid line position. As it does so, after the pin 86 is withdrawn from the valve lips 83, the excess of atmospheric pressure over internal pressure will continue to hold the lips 83 open as the plunger 27 draws the membrane 44 to maximum volume position; this establishes atmospheric pressure in the chamber cavity 52 at the solid line position of FIG. 3.

Various modifications in construction and use of the present invention will suggest themselves. Thus, while surface cohesion of the inner surfaces of the lips 83 permits extremely slow movement of the plunger 27 from the maximum volume position to the reduced volume position, for many utilizations the valve 80 might be fabricated of a flexible material lacking such surface cohesion; because the lips 83 will remain sealed by any substantial buildup of pressure in the secondary chamber 75. Likewise, the present disclosure is applicable to movements of sensors of other types, and may operate not only switches of various types but also valves or other devices.

I claim:

1. A combined check valve and pressure dump valve for a gas whose pressure may range from below to above an ambient pressure, comprising a walled chamber having gas passage means whereby to communicate gas pressure and having in addition thereto a gas conducting opening, a flexible rubber-like check valve mounted in said opening, said check valve there having a circumferential mounting flange by which it supported, and a mouth portion including lip portions extending therefrom and whose inner surfaces taper from said mouth portion toward each other for normal flatwise presentation againsteach other, whereby to part and thereby permit gas flow into said chamber on a deficiency of pressure therein below such ambient gas pressure and to seal together on excess of chamber pressure over such ambient pressure, in combination with a release pin whose cross section is sufficiently small, relative to the size of said lip portions, to distend and part them from each other without sealing about said pin, and means to insert said pin from outside the pressure chamber through the mouth portion of said check valve and inwardly between the tapering inner surfaces of said lip portions, whereby to distend and part same, thereby to suddenly dump and discharge any excess of chamber pressure over ambient pressure.

2. A releasable fluid flow valve as defined in claim 1, wherein the lip means are normally presented flatwise against each other, and material of which said flexible member is formed is characterized by surface cohesion, whereby the lip means will remain sealed when the inward and outward pressures are equal.